(12) United States Patent
Valle

(10) Patent No.: US 10,485,220 B2
(45) Date of Patent: Nov. 26, 2019

(54) PET TOYS USABLE WITH ANNULAR FOODSTUFFS

(71) Applicant: Doskocil Manufacturing Company, Inc., Arlington, TX (US)

(72) Inventor: Andrea M. Valle, Stanhope, NJ (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 15/609,546

(22) Filed: May 31, 2017

(65) Prior Publication Data

US 2017/0258046 A1 Sep. 14, 2017

Related U.S. Application Data

(62) Division of application No. 14/520,936, filed on Oct. 22, 2014, now Pat. No. 9,675,050.

(51) Int. Cl.
*A01K 15/02* (2006.01)
*A01K 5/00* (2006.01)

(52) U.S. Cl.
CPC .............. *A01K 15/026* (2013.01); *A01K 5/00* (2013.01)

(58) Field of Classification Search
CPC ..... A01K 15/02; A01K 15/025; A01K 15/026
USPC ................. 119/702, 707, 708, 709, 710, 711
See application file for complete search history.

(56) References Cited

U.S. PATENT DOCUMENTS

| 4,557,219 | A | 12/1985 | Edwards |
| D348,959 | S * | 7/1994 | Lawson ...................... D30/160 |
| 5,832,877 | A | 11/1998 | Markham |
| 5,865,146 | A | 2/1999 | Markham |
| 6,050,224 | A | 4/2000 | Owens |
| 6,470,830 | B2 | 10/2002 | Mann |
| 2006/0102099 | A1 | 5/2006 | Edwards |
| 2009/0078214 | A1 | 3/2009 | Mann |
| 2011/0259282 | A1 | 10/2011 | Tsengas et al. |
| 2012/0145090 | A1* | 6/2012 | Kolozsvari .......... A01K 15/026 119/710 |
| 2013/0087104 | A1 | 4/2013 | Williams et al. |
| 2014/0186276 | A1 | 7/2014 | Mahe |
| 2015/0313184 | A1* | 11/2015 | Woolwine ............ A01K 15/026 119/51.01 |

* cited by examiner

*Primary Examiner* — Lisa L Tsang
(74) *Attorney, Agent, or Firm* — Global IP Counselors, LLP

(57) ABSTRACT

A plurality of pet toys are usable with annular-shaped foodstuffs. Each pet toy includes a support upon which the animal foodstuffs can be situated and one or more retainers connected with the support that retain the animal foodstuffs on the support. At least one retainer on each toy includes one or more elastically deformable structures that are movable between a free state and an elastically deformed state. In the elastically deformed state, an animal foodstuff can be received across the retainer and onto the support. In the free state, the retainer is structured to resist removal of the animal foodstuff from the support and across the retainer.

8 Claims, 8 Drawing Sheets

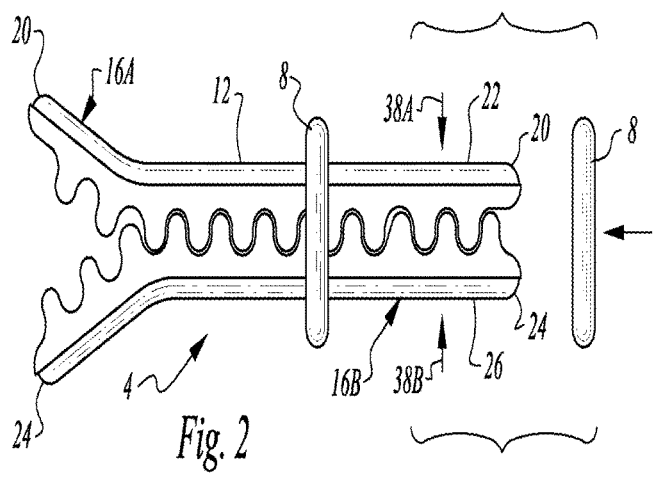
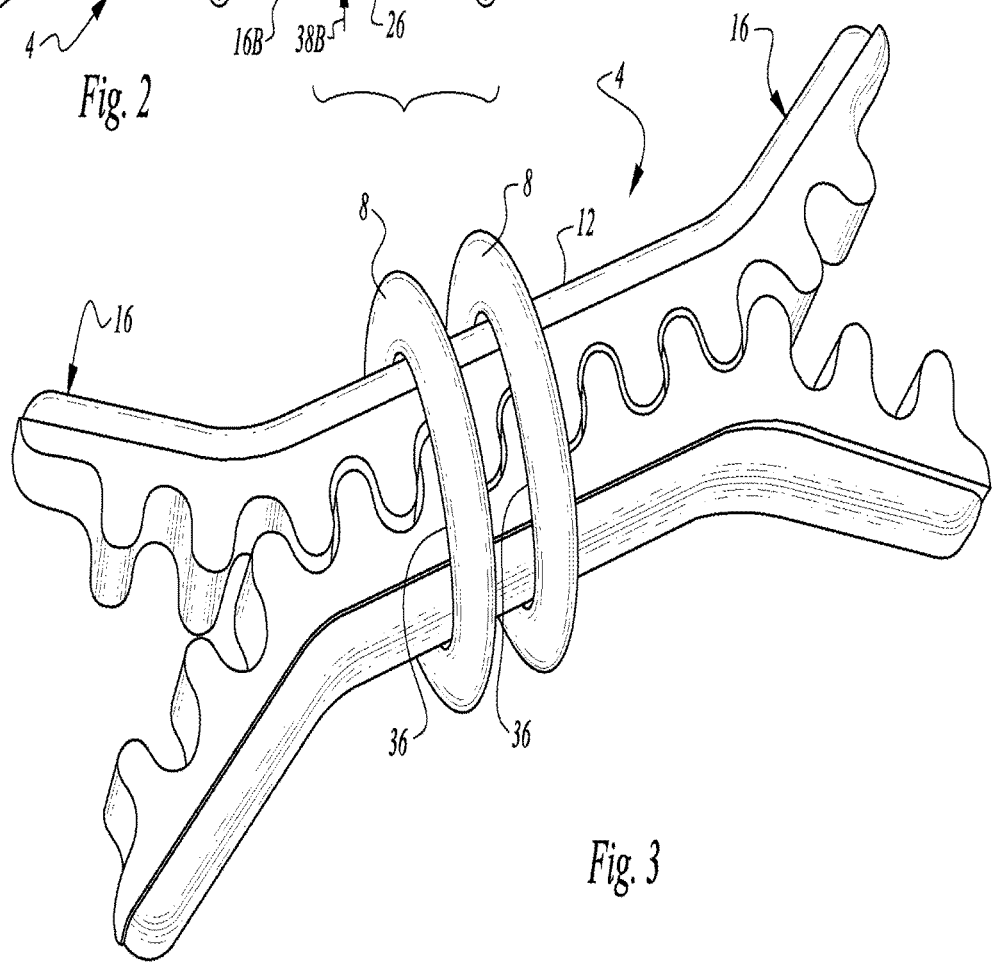

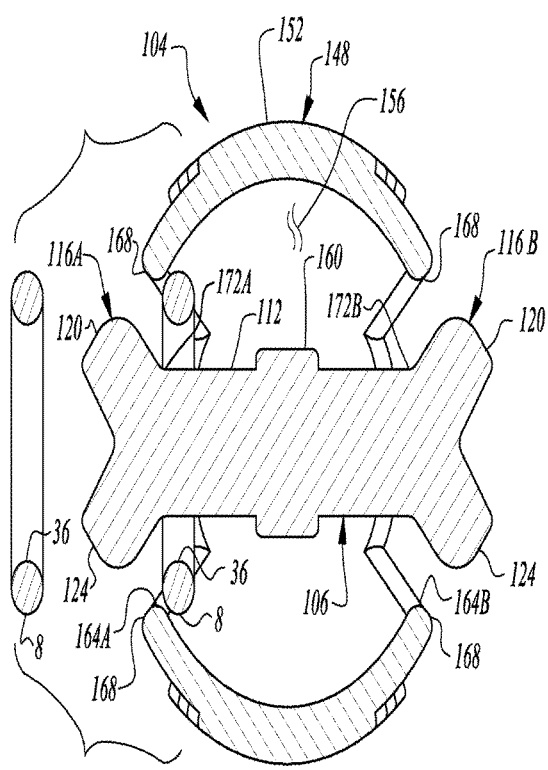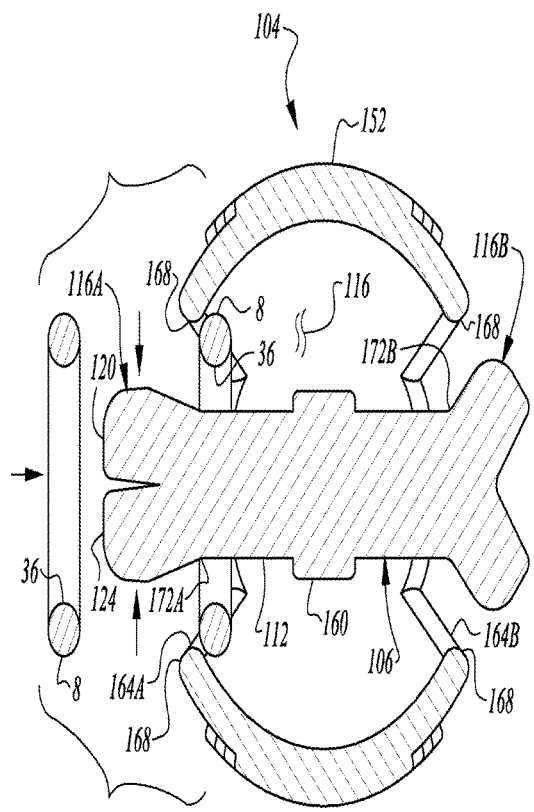
Fig. 5                      Fig. 6

PET TOYS USABLE WITH ANNULAR FOODSTUFFS

CROSS-REFERENCE TO RELATED APPLICATION

This application is a divisional application of U.S. patent application Ser. No. 14/520,936, filed Oct. 22, 2014, the disclosure of which is hereby incorporated by reference herein.

BACKGROUND

Field

The disclosed and claimed concept relates generally to animal toys and, more particularly, to a number of animal toys that are usable with foodstuffs having a generally annular shape.

Related Art

Numerous types of animal toys are known in the relevant art. Such animal toys typically include toys for domestic dogs and cats that enable the animal to actualize their predator-prey instincts, that allow them to chew, and/or that make noises or have other features that generate interest in the animal and alleviate boredom. Such toys desirably are configured to generate continued interest in the animal over an extended period of time, and one way of generating such continued interest is to combine the toy with food in some fashion. For example, certain animal toys having a hollow interior space have been filled with peanut butter, animal treats, and the like, and the animal can spend a significant amount of time attempting to taste and dislodge the food from the interior region. While such toys have been generally effective for their intended purposes, they have not been without limitation, and improvements thus would be desirable.

SUMMARY

A plurality of pet toys are usable with annular-shaped foodstuffs. Each pet toy includes a support upon which the animal foodstuffs can be situated and one or more retainers connected with the support that retain the animal foodstuffs on the support. At least one retainer on each toy includes one or more elastically deformable structures that are movable between a free state and an elastically deformed state. In the elastically deformed state, an animal foodstuff can be received across the retainer and onto the support. In the free state, the retainer is structured to resist removal of the animal foodstuff from the support and across the retainer.

Accordingly, an aspect of the disclosed and claimed concept is to provide an improved animal toy that is usable in conjunction with one or more annular foodstuffs.

Another aspect of the disclosed and claimed concept is to provide such a toy that includes one or more elastically deformable portions that can retain an animal foodstuff thereon when in a free state and that permit addition or removal of foodstuffs in a deformed state.

Accordingly, an aspect of the disclosed and claimed concept is to provide an improved animal toy that is structured to retain thereon an animal foodstuff which is of an annular shape and which has a hole formed therein. The animal toy can be generally stated as including an elongated support structured to carry the foodstuff thereon when at least a portion of the support is received in the hole of the foodstuff, a retention apparatus that can be generally stated as including at least a first retainer situated at an end of the support and structured to be elastically deformable between a free state and a deformed state, the at least first retainer in the deformed state being structured to be at least partially received in the hole of the foodstuff and being further structured to permit the foodstuff to be moved along the at least first retainer and onto the support whereby the support is at least partially received in the hole, and the at least first retainer in the free state being structured to resist removal of the foodstuff from the support

BRIEF DESCRIPTION OF THE DRAWINGS

A further understanding of the disclosed and claimed concept can be gained from the following Description when read in conjunction with the accompanying drawings in which:

FIG. 2 is a view of the toy of FIG. 1 in a partially elastically deformed state;

FIG. 3 is another perspective view of the toy of FIG. 1;

FIG. 5 is a sectional view as taken along line 5-5 of FIG. 4;

FIG. 6 is a view similar to FIG. 5, except depicting the toy in a partially elastically deformed state;

Similar numerals refer to similar parts throughout the specification.

DESCRIPTION

Figure 1:
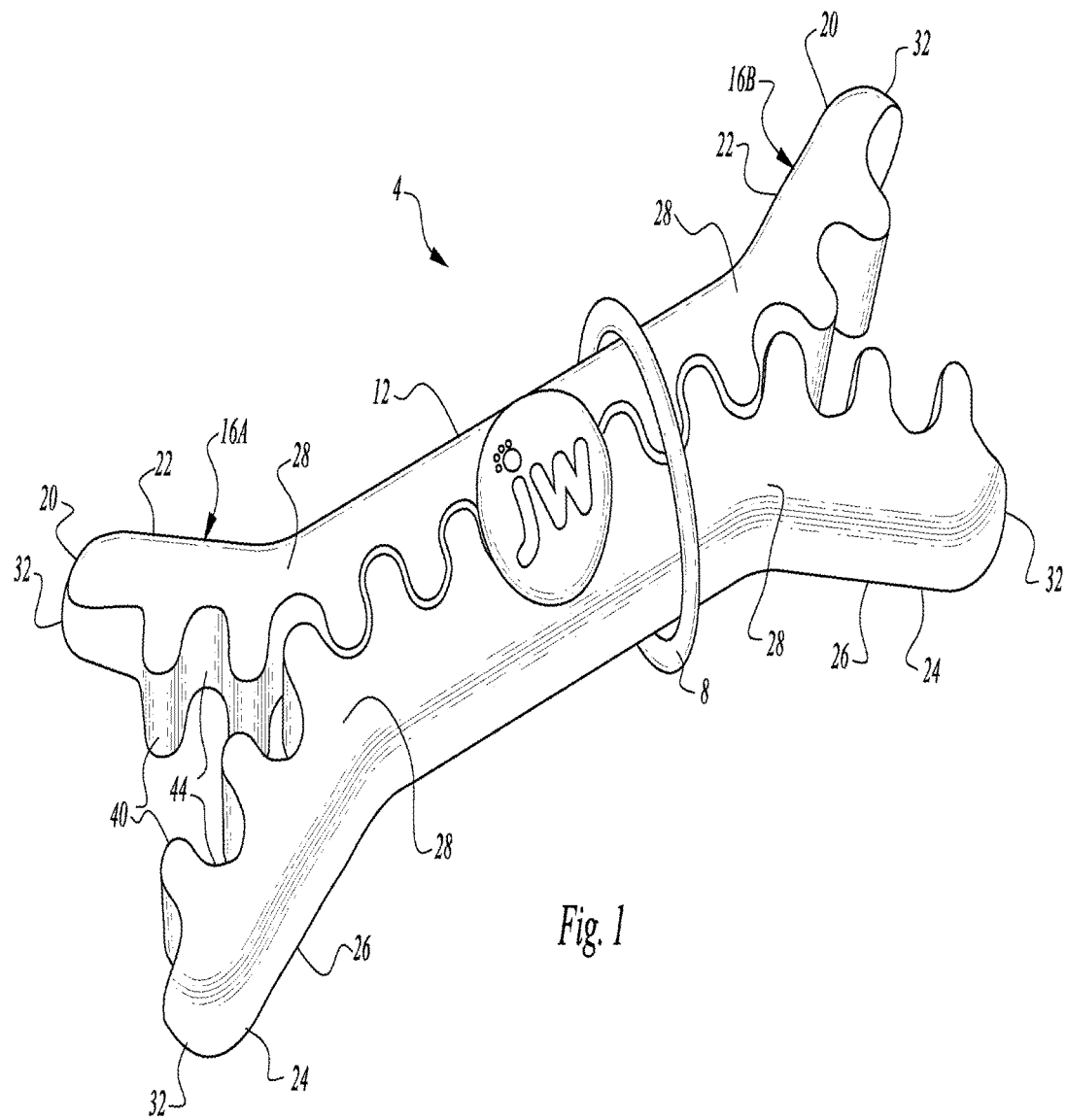
FIG. 1 is a perspective view of an improved toy in accordance with a first embodiment of the disclosed and claimed concept.

An improved pet toy 4 in accordance with a first embodiment of the disclosed and claimed concept is depicted generally in FIGS. 1-3. Pet toys in accordance with other embodiments of the disclosed and claimed concept are depicted generally in FIGS. 4-11. Each embodiment of the toy is usable with a number of animal foodstuffs 8 that are of a generally annular or ring-shaped configuration. As employed herein, the expression "a number of" and variations thereof shall refer broadly to any non-zero quantity, including a quantity of one. The toys are configured to retain the animal foodstuffs 8 thereon in order to increase the interest of an animal in the toys and to cause the animal to play with the toys, both of which are desirable. In the depicted exemplary embodiment, the animal foodstuffs 8 are animal treats formed from edible materials suitable for consumption by an animal.

In the first embodiment of FIGS. 1-3, the pet toy includes an elongated support 12 and further includes a pair of retainers 16A and 16B at the opposite ends of the support 12. The retainers 16A and 16B may be individually or collectively referred to herein with the numeral 16. Each retainer includes a pair of elastically deformable arms 20 and 24 that elastically deflectable between a free state, such as is depicted generally in FIGS. 1 and 3, and an elastically deformed state, such as is depicted generally in FIG. 2. The arms 20 and 24 each have a first end 28 that is situated on the support 12 and further have a second end 32 opposite thereto that can be said to be a free end. In the free state of FIGS. 1 and 3, the arms 20 and 24 are in an undeformed condition and are in an orientation whereby they diverge from one another in a direction generally away from the support 12.

The animal foodstuffs each have a central hole 36 formed therein that is configured to receive therein one of the retainers 16 in its elastically deformed state and/or the support 12. In order to place an animal foodstuff 8 onto the pet toy 4, the arms 20 and 24 of one of the retainers 16, i.e., the retainer 16 at either end of the support, are elastically deflected from the free state to the elastically deformed state, as is depicted in FIG. 2. Such elastic deflection of the arms 20 and 24 can be accomplished manually by application of a pair of confronting compressive forces 38A and 38B to the arms 20 and 24 at a location approximately adjacent the second ends 32. In the elastically deformed state, the arms 20 and 24 of the retainer 16 are positioned relatively closer to one another than when in the free state. In the elastically deformed state, the arms 20 and 24 are either generally no longer divergent from one another or are divergent to a lesser degree. The arms 20 and 24 in the elastically deformed state may be situated in physical contact with one another along at least a portion of their longitudinal extent.

Once the arms 20 and 24 have been deflected to the elastically deformed state of FIG. 2, an animal foodstuff 8, i.e., an animal treat, can be received on the retainer 16 such that at least a portion of the pair of arms 20 and 24 of the retainer 16 are received in the hole 36 formed in the animal foodstuff. In the deformed state, the pair of arms 20 and 24 have an exterior dimension that is less than the diameter of the hole 36. The animal foodstuff 8 is then advanced along the retainer 26 (in the deformed state) until the animal foodstuff 8 reaches the support 12, at which point the arms 20 and 24 of the retainer 16 can be released and permitted to elastically return to their free state. In this regard, it is noted that the arms 20 and 24 could be released from their elastically deformed state while a portion of the retainer 16 is still received in the hole 36, and the arms 20 and 24 moving toward their free state will tend to urge the animal foodstuff 8 generally toward the support 12.

When the retainers 16 of the pet toy 4 are in their free state, the divergent arms 20 and 24 have a pair of outboard surfaces 22 and 26, respectively, that face generally away from each other. In the free state, at least a portion of the outboard surfaces 22 and 26 are spaced apart a distance greater than the diameter of the hole 36 in the animal foodstuff 8. As such, the arms 20 and 24 in their free state retain the animal foodstuffs 8 on the support 12 by resisting movement of the animal foodstuff 8 beyond the portions of the outboard surfaces 22 and 26 that are spaced farther apart than the diameter of the hole 36.

It is noted that the animal foodstuffs 8 that are situated on the support 12 and are retained thereon by the retainers 16 are freely translatable along the longitudinal extent of the support 12 between the two retainers 16 because the cross-sectional dimension of the support 12 is smaller than the diameter of the hole 36 in the animal foodstuff The pet toy 4 in its condition depicted generally in FIG. 3 can then be offered to an animal, and the animal can then chew, paw, and otherwise manipulate the pet toy 4 and the animal foodstuffs 8 retained thereon in order to attempt to taste the animal foodstuff 8 and/or to remove the animal foodstuffs 8 from their position situated on the support 12, which is desirable animal play.

It can be seen that the arms 20 and 24 of each retainer 16 include sets of alternating teeth 40 and grooves 44 that inter-engage with one another in the deformed state of the toy 4. The teeth 40 provide additional material which can be chewed by the animal, and the teeth 40 and grooves 44 also provide a visual appearance that is interesting to the animal, both of which are highly desirable.

Figure 4:
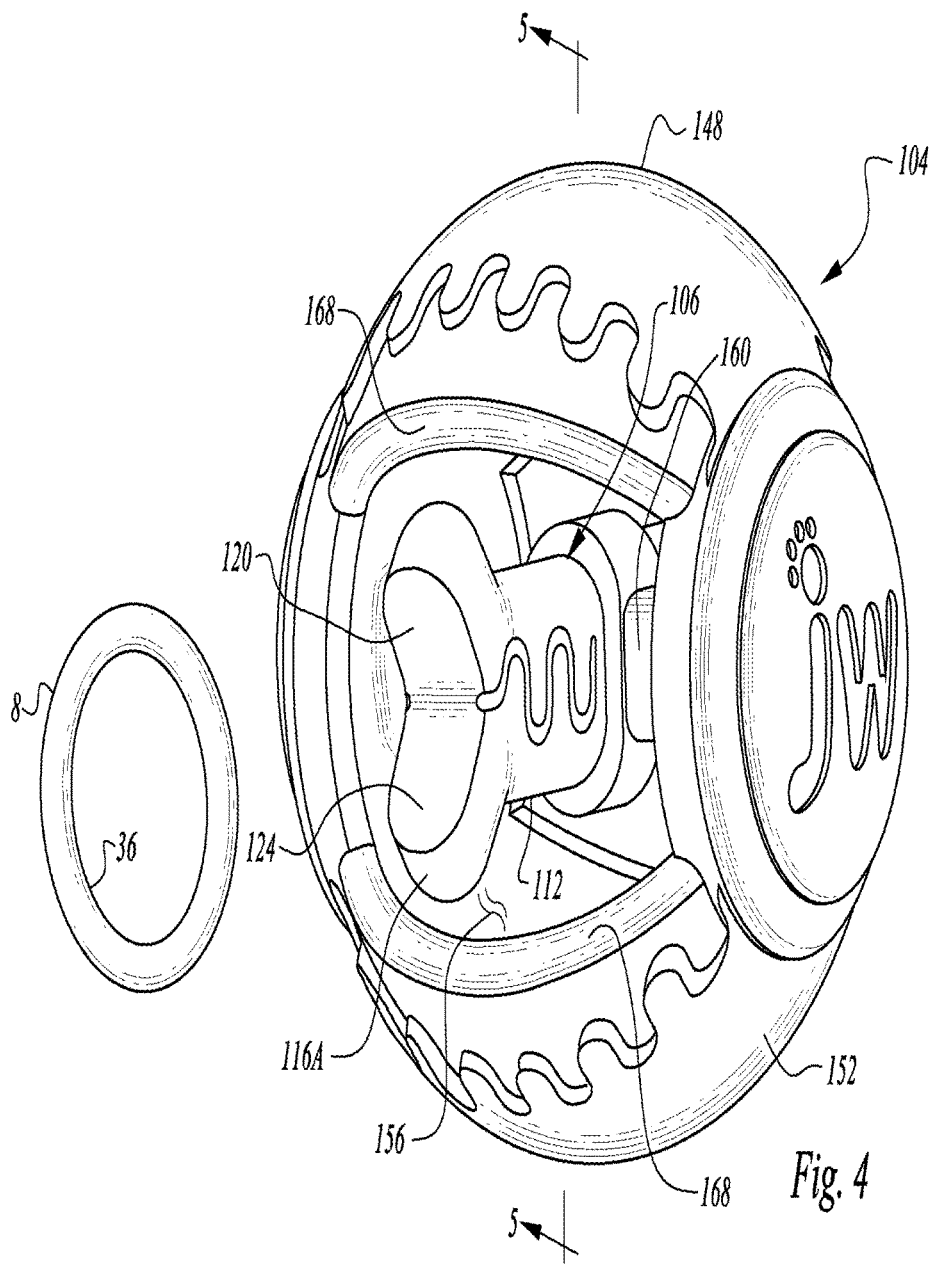
FIG. 4 is a perspective view of an improved toy in accordance with a second embodiment of the disclosed and claimed concept.

An improved pet toy 104 in accordance with a second embodiment of the disclosed and claimed concept is depicted generally in FIGS. 4-6. The pet toy 104 includes an approximately dogbone-shaped treat holder 106 that is disposed on a blocking apparatus 148 having an approximately partially spherical shape. The blocking apparatus 148 includes an outer wall 152 that is hollow and that thus has an interior region 156. The blocking apparatus 148 further includes a strut 160 that mounted to the outer wall 152 within the interior region 156 and that is situated generally within the interior region 156. The outer wall 152 is of a generally partially spherical shape, but it includes a pair of opposed openings 164A and 164B through which the ends of the dogbone-shaped treat holder 106 protrude. The openings 164A and 164B may be individually or collectively referred to herein with the numeral 164. The blocking apparatus 148 includes a first pair of distal ends 168 that are situated at the opening 164A and includes a second pair of distal ends 168 situated at the opening 164B.

The bone-shaped treat holder 106 includes an elongated support 112 and further includes a pair of retainers 116A and 116B at the opposite ends thereof The retainers 116A and 116B may be individually or collectively referred to herein with the numeral 116. In a fashion similar to the pet toy 4 of FIGS. 1-3, the retainers 116 of the second embodiment of FIGS. 4-6 are situated at the opposite ends of the support 112 and each include a pair of arms 120 and 124 that are movable between a free state wherein the arms 120 and 124 are in a divergent orientation, as is depicted generally in FIGS. 4 and 5, and an elastically deformed state wherein the arms 120 and 24 are relatively closer together and enable an animal foodstuff 8 to be received thereon. The retainers 116 can be said to at least partially protrude through the openings 164 in the outer wall 152, which enables the aims 120 and 124 to be manually deformed between the free state and the elastically deformed state.

As can be understood from FIG. 6, the two retainers 116 are connected with the support 112 at a pair of junction points 172A and 172B situated at the opposite ends of the support 112. The junction points 172A and 172B may be individually or collectively referred to herein with the numeral 172. The junction points 172 are situated generally in close proximity to the two adjacent pairs of distal ends 168 of the outer wall 152. Moreover, the distal ends 168 are spaced apart from one another sufficiently to at least partially resist movement of an animal foodstuff 8 through the opening 164. In order to receive an animal foodstuff 8 onto the pet toy 104, the arms 120 and 124 of one of the retainers 116 are deformed from the free state of FIGS. 4 and 5 to the elastically deformed state of FIG. 6, and the deflected retainer 116 is then received in the hole 36 formed in the animal foodstuff 8. In order to advance the animal foodstuff 8 onto the support 112, the animal foodstuff 8 is tilted in a direction oblique to the longitudinal extent of the support 112 in order to enable the animal foodstuff 8 to be received through the opening 164, beyond the junction points 172, and onto the support 112. As employed herein, the expression "oblique" shall refer generally to a relationship that is neither perpendicular nor parallel. The arms 120 and 124 can then be released to permit the retainer 116 to elastically return to its free state.

When the retainer 116 is in its free state with the animal foodstuffs 8 situated on the adjacent portion of the support 112, the animal foodstuffs 8 are freely movable along the portion of the support 112 that extends between the strut 160 and the aforementioned retainer 116 that had been elastically deformed to receive the animal foodstuffs 8 thereon and had been subsequently released. However, and as can be seen in FIG. 6, when the retainer 116 is in its free state with the animal foodstuff 8 situated on the adjacent portion of the support 112, the distal ends 168 of the outer wall 152 and the arms 120 and 124 of the retainer 116 together at least somewhat retain the animal foodstuff 8 generally within the interior region 156 of the outer wall 152. The animal foodstuff 8 retained in such a fashion causes the animal to chew, paw and otherwise manipulate the pet toy 104 in order to attempt to taste the animal foodstuff 8 and/or to remove the animal foodstuff 8 from its position situated on the support 112, which is desirable animal play.

Figure 7:
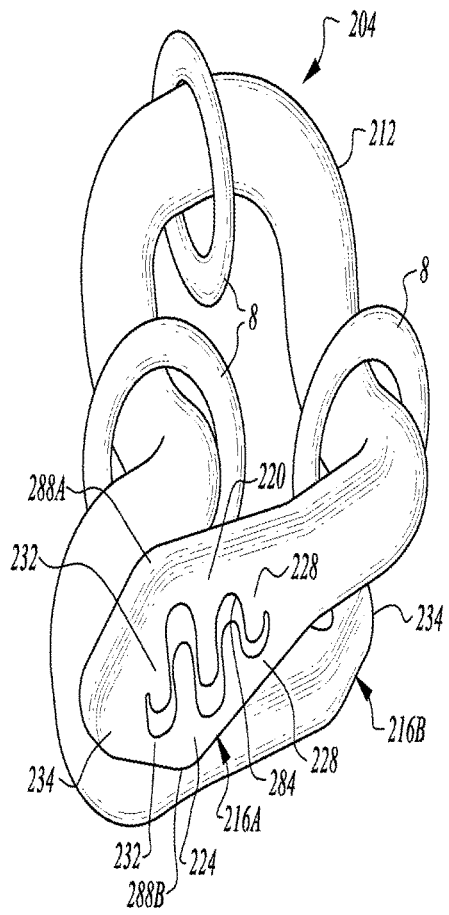
FIG. 7 is a perspective view of an improved toy in accordance with a third embodiment of the disclosed and claimed concept.
Figure 8:
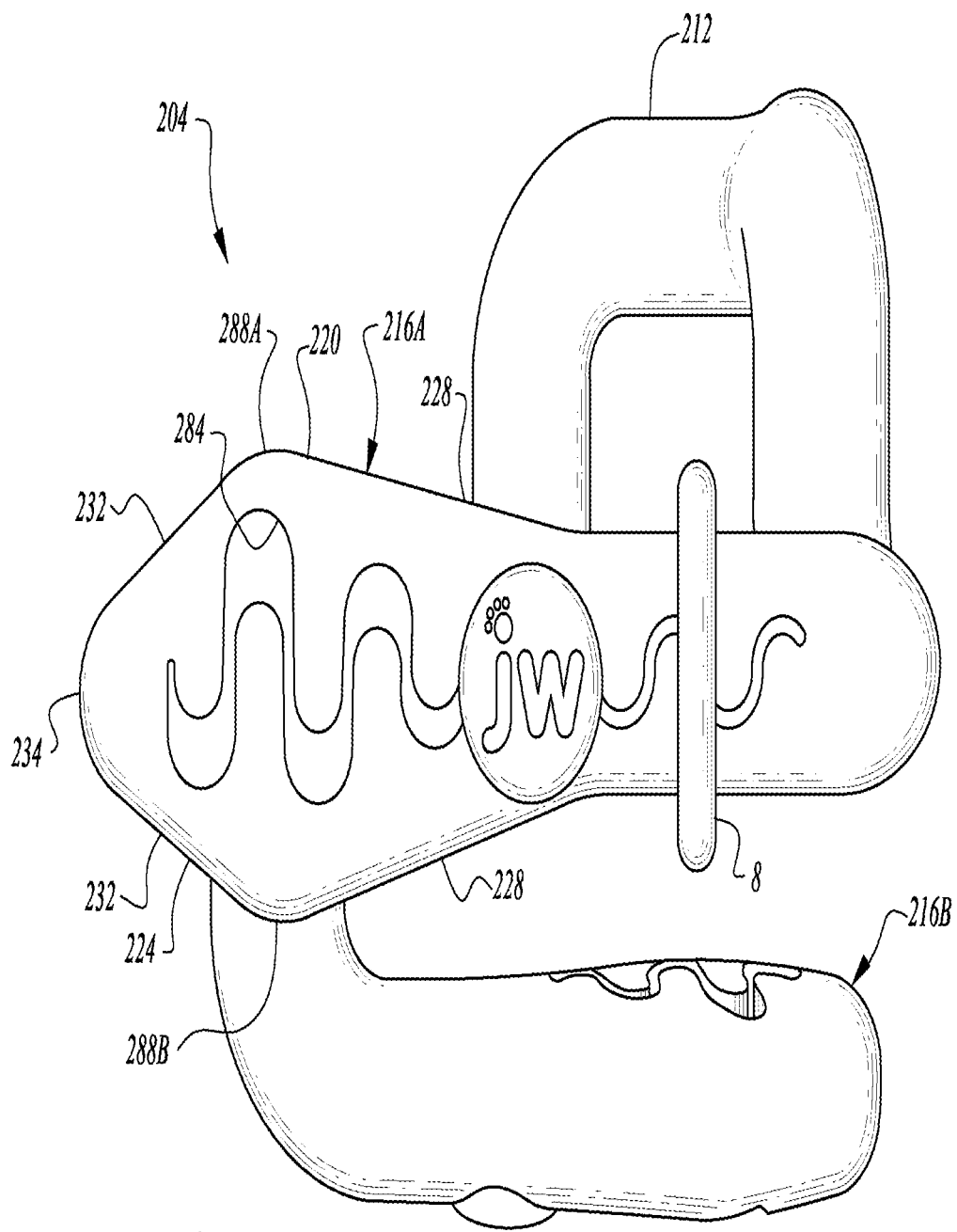
FIG. 8 is a front elevational view of the toy of FIG. 7.
Figure 9:
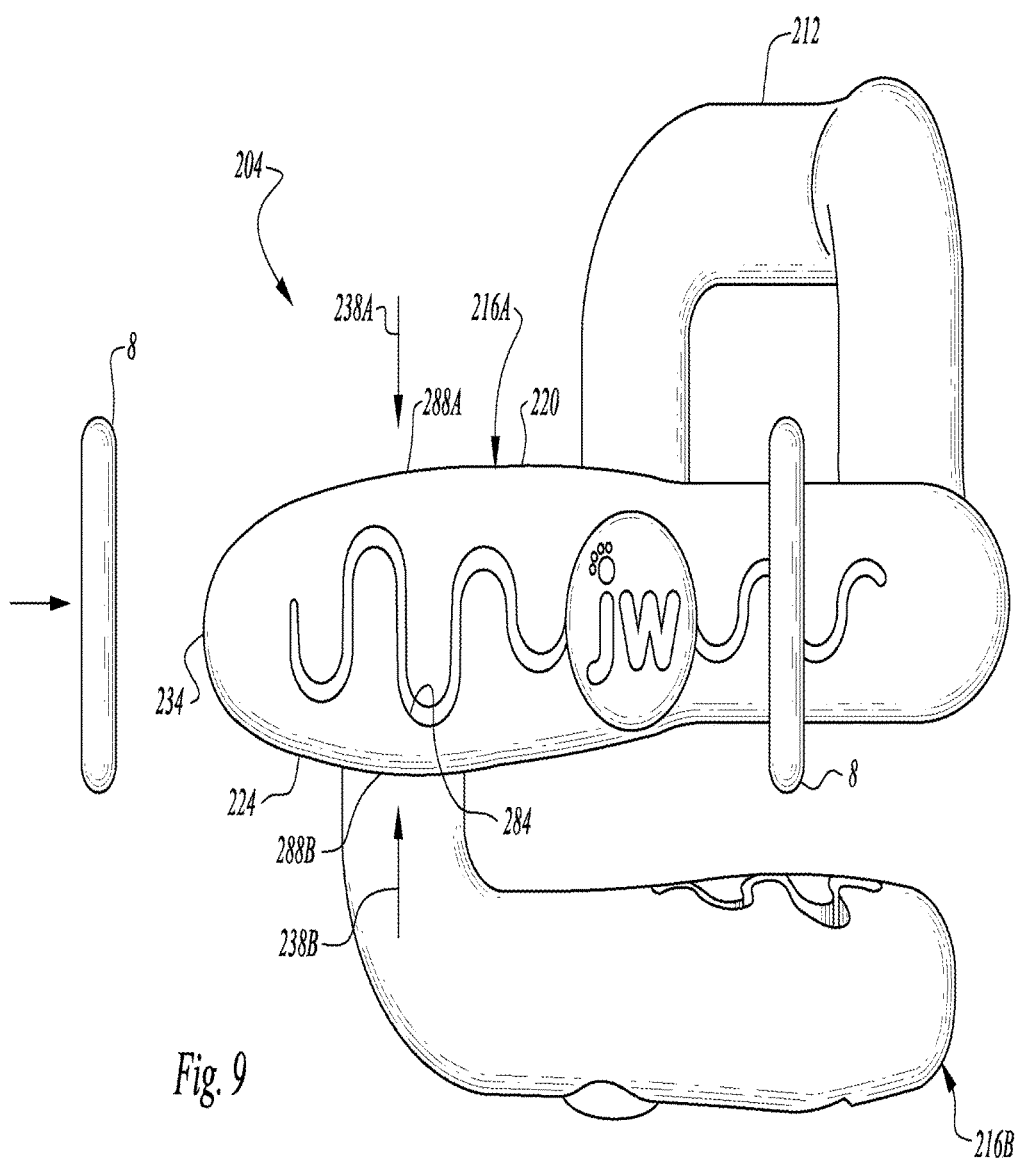
FIG. 9 is a view similar to FIG. 8, except depicting the toy in a partially elastically deformed state.

An improved toy 204 in accordance with a third embodiment of the disclosed and claimed concept is depicted generally in FIGS. 7-9. The toy 204 includes a support 212 and a pair of retainers 216A and 216B at opposite ends of the support 212. The retainers 216A and 216B may be individually or collectively referred to herein with the numeral 216.

The retainers 216 each include a pair of arms 220 and 224 that each have a first end 228 that is situated on the support 212 and further include a second end 232 opposite thereto. It is noted that the second ends 232 are each connected with a connector 234 and thus can be said to be connected together. A channel 284 is formed in the toy 204 between the aims 220 and 224 to essentially form the arms 220 and 224 and to define or distinguish one from the other. The arms 220 and 224 each include a proud portion 228A and 228B, respectively. The proud portions 228A and 228B are situated on the arms 220 and 224, respectively, at a location generally opposite the channel 284.

In the free state of the retainers 216, as is depicted generally in FIGS. 7 and 8, the midportions of the arms 220 and 224 are spaced apart from one another, meaning that a number of teeth and grooves formed in the arms 220 and 224 are disengaged from one another and are spaced apart. However, if a pair of confronting compressive forces, such as are depicted with the numerals 238A and 238B in FIG. 9, are applied to the proud portions 288A and 288B, the retainer 216 is moved from its free state of FIGS. 7 and 8 to its elastically deformed state of FIG. 9. In the elastically deformed state, the teeth and grooves are engaged with one another, and the proud portions 288A and 288B (and the midportions of the arms 220 and 224) are relatively closer to one another than in the free state. More particularly, the proud portions 288A and 288B in the elastically deformed state of FIG. 9 are spaced apart by a distance less than the diameter of the central hole 36 in the foodstuffs 8, which permits the elastically deformed retainer 216 to be received in the central hole 36 as the animal foodstuff 8 is slid onto the toy 204. Once the foodstuff 8 has been moved onto the retainer 216 beyond the proud portions 288A and 288B, the compressive forces 238A and 238B can be removed from the arms 220 and 224, whereupon the retainer 216 will elastically return toward its free state. In so doing, a pair of outboard surfaces of the arms 220 and 224 opposite the channel 284 may engage the animal foodstuff 8 at the central hole 36 and urge the animal foodstuff 8 toward the support 212. Since the proud portions 288A and 288B in the free state of the retainer 216 are separated apart from one another by a distance greater than the diameter of the central hole 36, the retainer 216 in its free state retains the animal foodstuffs 8 on the support 212 and on the portions of the retainers 216 where the outboard surfaces are spaced apart a distance less than the diameter of the central hole 36. The support 212 is elongated and has a plurality of bends and straight portions that are connected together that form a tortuous path between the retainers 216 along which the animal foodstuffs 8 can be moved by the animal, which increases interest in the animal for the toy 204.

Figure 10:
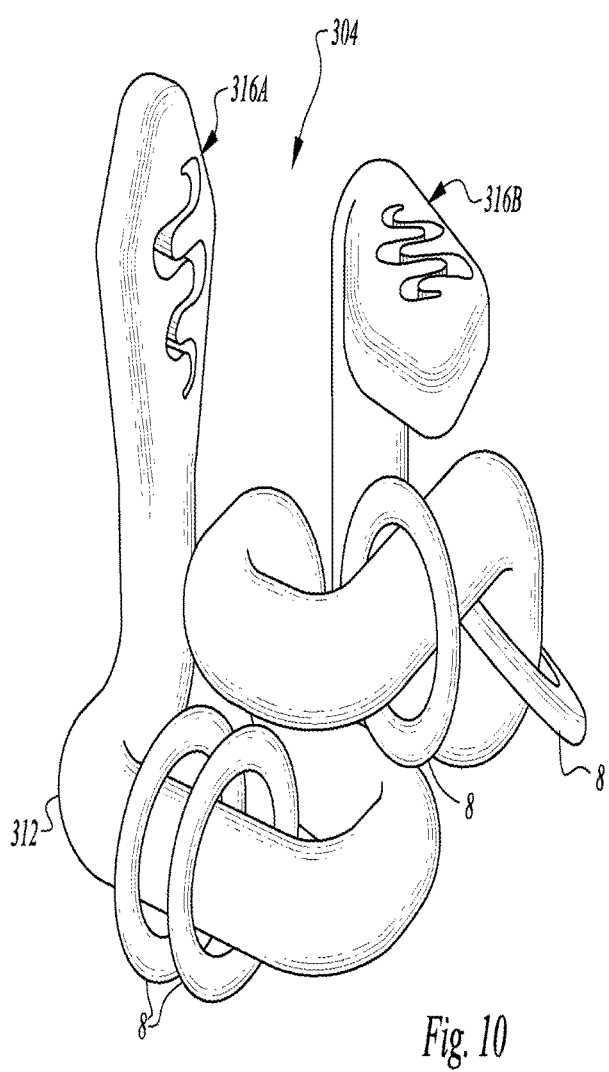
FIG. 10 is a perspective view of a toy in accordance with a fourth embodiment of the disclosed and claimed concept.

An improved toy 304 in accordance with a fourth embodiment of the disclosed and claimed concept is depicted generally in FIG. 10. The toy 304 includes a support 312 and a pair of retainers 316A and 316B situated at opposite ends of the support 312. The toy 304 is substantially similar to the toy 204 except that the toy 304 includes a different number of bends and straight regions in the support 312, and the bends and straight regions are in a different arrangement in the toy 304 than in the toy 204 to provide a different tortuous path between the retainers 316A and 316B. Animal foodstuffs 8 can be received on the toy 304 by elastically deforming the retainers 316A and 316B in the fashion mentioned above in the context of the toy 204.

Figure 11:
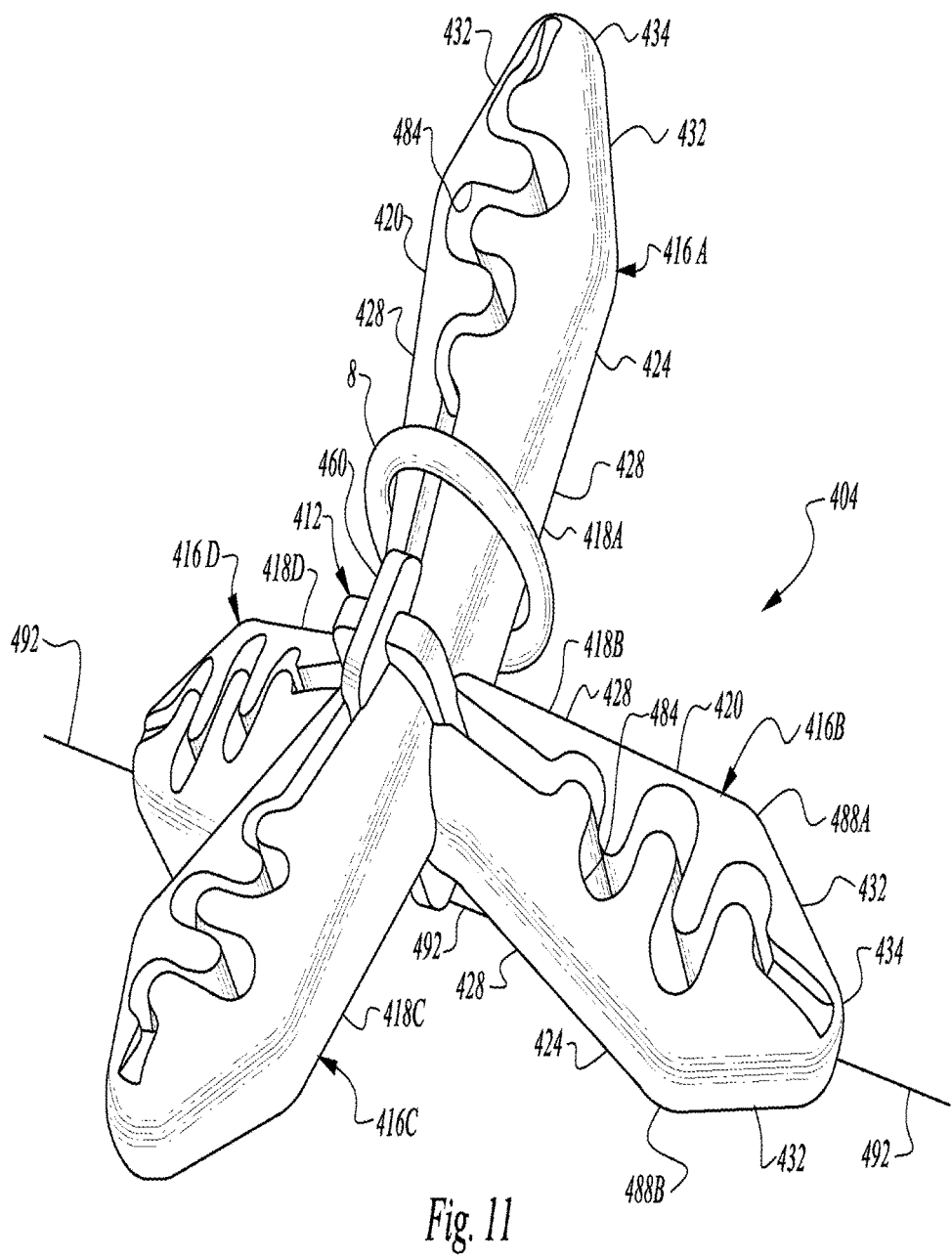
FIG. 11 is a perspective view of an improved toy in accordance with a fifth embodiment of the disclosed and claimed concept.

An improved toy 404 in accordance with a fifth embodiment of the disclosed and claimed concept is depicted generally in FIG. 11. The toy 404 includes a support 412 and a plurality of retainers 416A, 416B, 416C, and 416D. The retainers 416A, 416B, 416C, and 416D may be individually or collectively referred to herein with the numeral 416. Each retainer 416 includes a pair of arms 420 and 424 that have formed therebetween a channel 484 that forms on the arms 420 and 424 a number of teeth and grooves that are engageable with one another in a fashion similar to the way in which the teeth and grooves of the arms 220 and 224 are engaged with one another in the elastically deformed state. The arms 420 and 424 each include a proud portion 488A and 488B, respectively, that is situated thereon opposite the channel 484. The arms 420 and 424 are movable between the free state depicted generally in FIG. 11 and an elastically deformed state that is similar to the elastically deformed state that is depicted generally in FIG. 9.

The support 412 can be said to include a central strut 460 to which the retainers 416 are each connected and from which they each extend. The arms 420 and 424 of each retainer 416 include a first end 428 that is connected with the strut 460 and a second end 432 opposite thereto that is connected with a connector 434 whereby the second ends 432 can be said to be connected together. A portion of each retainer 416A, 416B, 416C, and 416D can be said to include a lug region 418A, 418B, 418C, and 418D that is situated adjacent the strut 460 and that extends generally between the strut 460 and the proud portions 488A and 488B. The lug regions 418A, 418B, 418C, and 418D may be individually or collectively referred to herein with the numeral 418. The lug regions 418 together with the strut 460 can be said to form the support 412.

When the proud portions 488A and 488B are subjected to confronting compressive forces in the fashion of FIG. 9, the arms 420 and 424 are elastically deformed from their free state, which is depicted generally in FIG. 11, to an elastically deformed state similar to that depicted in FIG. 9 wherein the teeth and grooves engage one another or are at least situated relatively closer to one another. While in the free state the proud portions 488A and 488B are spaced apart from one another a distance greater than the diameter of the central hole 36 in the foodstuffs 8. However, the proud portions 488A and 488B in the elastically deformed state of the retainer 416 are spaced apart a distance less than the diameter of the central hole 36, whereupon a foodstuff 8 can be received on the retainer 416 and beyond the proud portions 488A and 488B and onto the associated lug region 418. When the confronting compressive forces are released from the proud portions 488A and 488B, the arms 420 and 424 elastically return to their free state, whereupon the proud portions 488A and 488B resist removal of the animal foodstuffs 8 from the associated lug region 418.

It can be seen that the retainers 416A and 416C are situated generally opposite one another on the strut 460, and the same can be said of the retainers 416B and 416D. The retainers 416 each extend from the strut 460 in a non-planar fashion, and it can be seen from FIG. 11 that the retainers 416A and 416C extend from the strut 460 in a generally upward direction from the perspective of FIG. 11 whereas the retainers 416B and 416D extend in a generally downward direction from the strut 460 from the perspective of FIG. 11. As such, the connectors 434 of the retains 416B and 416D can engage a floor 492 and in so doing can cause the other portions of the toy 404 to be situated at a location spaced above the floor 492. This advantageously causes the strut 460 and the retainers 416A and 416C to wobble on the floor 492 in the fashion of a seesaw until the connector 434 of one the retainer 416A and the retainer 416C engages the floor 492. Such wobbling and apparent unsteadiness further increase the interest of the animal in the toy 404. In this regard, it can be understood that the retainers 416A and 416C can likewise engage the floor 492 if the toy 404 is turned upside down and can likewise cause the strut 460 and the retainers 416B and 416D to wobble in the aforementioned seesaw fashion.

The various embodiments of the pet toy 4, 104, 204, 304, and 404 are configured to generally retain the animal foodstuffs 8 thereon, but it is understood that the pet may eventually chew the animal foodstuff 8 and/or elastically deform portions of the pet toys in order to eventually remove the animal foodstuffs 8 from being retained on the pet toys 4, 104, 204, 304, and 404. This again is desired play by the animal since it retains the interest of the animal and resists the animal from chewing other objects that may be available such as furniture, shoes, and the like that may be damaged or destroyed if the animal does not have other things upon which the animal can desirably chew.

The pet toys 4, 104, 204, 304, and 404 described herein can be formed from any of a wide variety of appropriate semi-rigid or rigid elastomeric materials, such as rubber and numerous other rubber-like or other resilient materials. Portions of the pet toy depicted generally in FIGS. 4-6, such as the blocking apparatus 148, can alternatively be formed of a relatively harder or stiffer material such as TPR or other appropriate material depending upon the needs of the particular application. The animal foodstuffs 8 can likewise be formed of any of a wide variety of materials and may include, for example, ground rawhide, malt extract, a flavorant, an odorant, and other such materials without limitation.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An animal toy configured to retain an annular shaped animal foodstuff having a hole formed therein, the animal toy comprising:
    an elongated support configured to carry the annular shaped animal foodstuff thereon, at least a portion of the support configured to pass through the hole of the annular shaped animal foodstuff; and
    a retention apparatus comprising a retainer disposed at an end of the support,
    the retainer including a pair of retainer arms that are connected and form an S-shaped channel therebetween and extending along a longitudinal length of the pair of retainer arms, and
    the retainer elastically deformable between a free state and a deformed state,
    the retainer in the deformed state being configured to pass through the hole of the annular shaped animal foodstuff, permitting the annular shaped animal foodstuff to be moved along the retainer and retainer arms and onto the support,
    the retainer in the free state being configured to resist removal of the annular shaped animal foodstuff from the retainer arms and the support,
    the free state being a rest position state and the retainer being in the deformed state when subject to compression forces.

2. The animal toy of claim 1 wherein when the retainer is in the deformed state, opposing teeth and grooves of the retainer engage each other.

3. The animal toy of claim 1 wherein the retainer includes opposed proud portions.

4. The animal toy of claim 3 wherein the opposed proud portions are configured to receive the compression forces to deform the retainer into the deformed state.

5. The animal toy of claim 1 wherein the support includes a right angle bend.

6. The animal toy of claim 5 wherein the right angle bend is one right angle bend of a plurality of right angle bends.

7. The animal toy of claim 1 wherein the support member includes a central strut.

8. The animal toy of claim 1, wherein the retainer arms are connected at a distal end to form the S-shaped channel therebetween.

* * * * *